United States Patent [19]
Stauffer

[11] 3,941,996
[45] Mar. 2, 1976

[54] AUTOMATIC FOCUS APPARATUS

[75] Inventor: Norman L. Stauffer, Englewood, Colo.

[73] Assignee: Honeywell Inc., Minneapolis, Minn.

[22] Filed: Aug. 27, 1974

[21] Appl. No.: 500,869

[52] U.S. Cl. ............... 250/201; 250/216; 250/233; 354/25; 356/126
[51] Int. Cl.² .................................. G01J 1/20
[58] Field of Search ........... 250/201, 233, 234, 216, 250/237 R; 356/123, 125, 126; 354/25, 195

[56] References Cited
UNITED STATES PATENTS

| | | | |
|---|---|---|---|
| 3,538,334 | 11/1970 | Shaffer, Jr. ................. | 356/123 X |
| 3,541,335 | 11/1970 | Harrington et al. .......... | 250/233 X |
| 3,555,280 | 1/1971 | Richards, Jr. .............. | 250/201 |
| 3,700,902 | 10/1972 | Buchan ...................... | 250/201 |

*Primary Examiner*—Walter Stolwein
*Attorney, Agent, or Firm*—Arthur H. Swanson; Lockwood D. Burton; George E. Bodenstein

[57] ABSTRACT

An optical focus detecting apparatus for an optical system includes a focus scanning and spatial frequency filter comprising a rotating chopper disc. The disc is arranged at an angle with respect to the axis thereof whereby the disc focus position is oscillated back and forth through a predetermined plane, which plane may comprise the film plane of a camera. The disc includes a plurality of transparent and opaque radial sector pairs, the widths of the sectors of any pair being the same and randomly different from the widths of the sectors of adjacent pairs. The sector pairs are so relatively arranged that sector pairs of substantially identical widths are repeated at positions displaced 180° on the disc whereby the modulation of the image optical spectrum is random in nature. The distribution of transparent and opaque sectors is such that the average transmission of light by the disc is 50 percent of the incident light.

3 Claims, 6 Drawing Figures

AUTOMATIC FOCUS APPARATUS

BACKGROUND OF THE INVENTION

1. Field of the Invention

This invention relates to optical apparatus for optimally focusing an image, and more particularly to apparatus for controlling the focus of an image in a camera.

2. Description of the Prior Art

Many concepts and techniques have been proposed in the prior art for detecting the focus of an optical system and for controlling the focus. Notwithstanding this, the determination of optimum focus for an optical system has continued to be difficult of achievement. In one form of apparatus that has been proposed in the prior art, the focus detecting system includes a spatial frequency filter which derives from the light output of a lens system a spatial frequency spectrum. Superimposed upon this spectrum is an amplitude modulation corresponding to scanning of the focus. There is thereby produced a fluctuating light flux pattern containing information concerning the focus. Focus information extracted from this pattern is employed to bring the image into a position of desired focus.

The spatial frequency filters of the known prior art apparatus have comprised rotating discs or drums having regularly spaced alternate transparent and opaque portions. Such discs or drums uniformally chop or interrupt, in the vicinity of the desired image plane, the components of the light beam that make up the image. When such a uniformly operating chopper or interrupter is used for the spatial frequency filter, it has been found that undesired changes in detected signal amplitude can occur, which changes give rise to spurious modulation and resulting error in the focus determination. This is believed to be due to signals that are produced by two, or several, subjects of nearly equal contrast but so positioned on the chopper that they produce out of phase signals for chopper positions where otherwise large amplitude signals would be expected.

SUMMARY OF THE INVENTION

Among the objects of the present invention is the provision of an optical focus detecting arrangement which is not subject to the foregoing disadvantage of the prior art apparatus.

Another object of the present invention is to provide an optical focus detecting apparatus including a spatial frequency filter comprising a light beam chopper or interrupter having alternate transparent and opaque sectors arranged in somewhat random manner whereby the interruptions of the light beam components in the vicinity of the desired image plane are effected in a non-uniform and random manner.

A further object of the present invention is to provide a spatial filtering apparatus comprising an oscillating chopper having a plurality of transparent and opaque sector pairs, the widths of both sectors of a pair being the same and randomly different from the widths of the sectors of adjacent pairs, sector pairs of the same width recurring at equally spaced intervals in each cycle of chopper operation.

In accomplishing these and other objects, there has been provided, in accordance with the present invention, an improved automatic focusing detecting apparatus having a novel focus scanning and spatial frequency filter. This novel focus detecting means includes a rotating chopper-type disc placed near a predetermined plane of an optical system, the film plane of a camera, for example, at which it is desired automatically to maintain an image in focus. The plane of the disc is arranged at an angle with respect to the rotational axis of the disc whereby the focus position of the spatial filter is oscillated or reciprocated through said predetermined desired image plane. This allows spatial scanning of the light ray components that make up the image, within and on both sides of chopper oscillation.

The chopper disc in a preferred form comprises a plurality of transparent and opaque radial sector pairs. The widths of both sectors of a pair are the same and are selected to be randomly different from the widths of the sectors of adjacent pairs. The sector pairs are so arranged on the disc that sector pairs of identical widths are repeated at positions displaced 180° on said disc. As a result, the average transmission of light flux by the chopper disc is 50 percent of the incident light flux and remains at that average during each complete rotation of the disc.

This focus detecting apparatus provides a recurring fluctuating light flux pattern containing information concerning the image focus with respect to said predetermined plane. Thus, with the image at the said predetermined plane, two such substantially equal fluctuating light flux patterns are produced for each rotation of the chopper disc. These fluctuating light patterns are spaced 180° in the cycle of chopper operation.

At the position of optimum focus, the image is produced in the predetermined plane, which plane is centrally located in the field through which the chopper disc oscillates as it is rotated. As noted, the fluctuating light pattern produced is then repeated twice for each revolution of the disc. Upon a shift of the image from the said predetermined plane, there is a shift in phase and of the shape of the fluctuating light pattern that is produced. The direction of the phase shift depends upon the direction of shift of the image from said predetermined plane.

A photo electric detector is provided to respond to the fluctuating light flux patterns that are so produced to provide a correspondingly varying electrical signal. This electrical signal is compared with a synchronous reference signal to provide an output signal. This output signal is indicative of the focus condition of the optical system, of the need for corrective adjustment of the optical system for optimum focusing. This signal, if desired, may be fed to a suitable indicator to indicate the direction for corrective action. In the preferred embodiment of the invention that is illustrated, the signal is employed as an error signal for servo control of the element of the optical system which controls the plane of focus of the image.

BRIEF DESCRIPTION OF THE DRAWINGS

A better understanding of the present invention may be had from the following detailed description when read in connection with the accompanying drawings, wherein.

DETAILED DESCRIPTION OF THE EMBODIMENT

Figure 1:
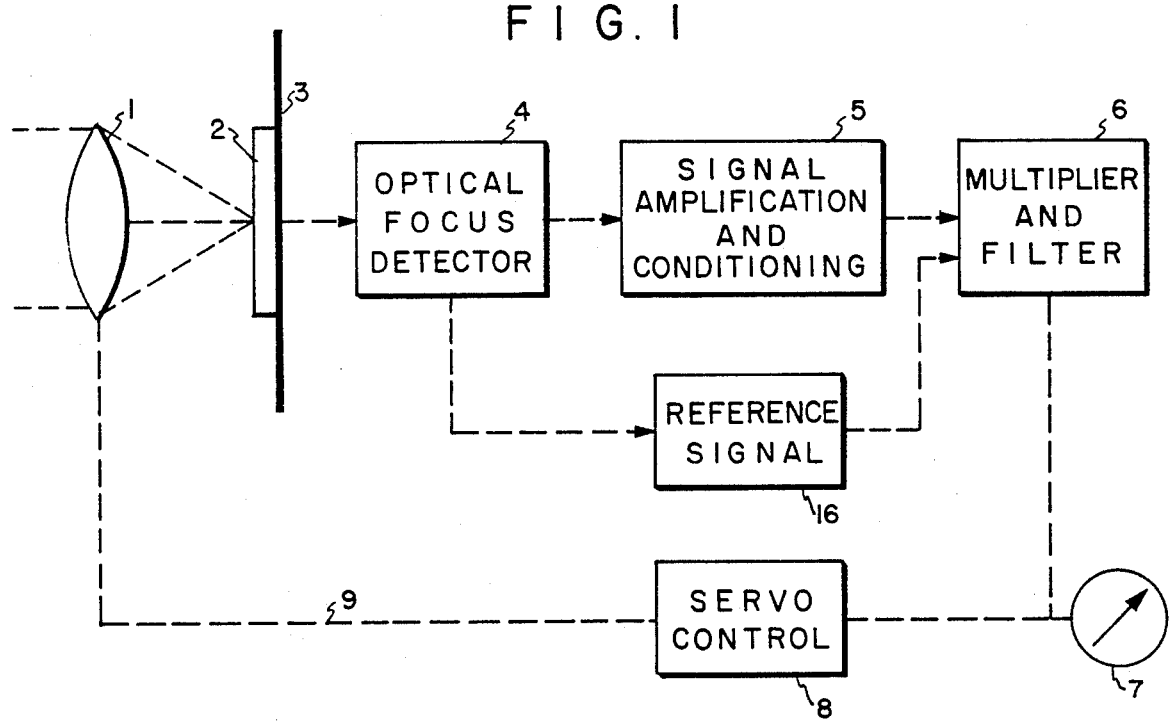
FIG. 1 is a block diagram of an optical focus control system according to the present invention, as applied to focus the lens of a camera.

The block diagram of FIG. 1 of the drawings shows the interrelations of the various components of the present invention, when used in conjunction with a camera. Thus, a camera lens 1 projects an image 2 near a predetermined plane 3 which is positioned to coincide with the emulsion plane of the film within the camera.

Figure 2:
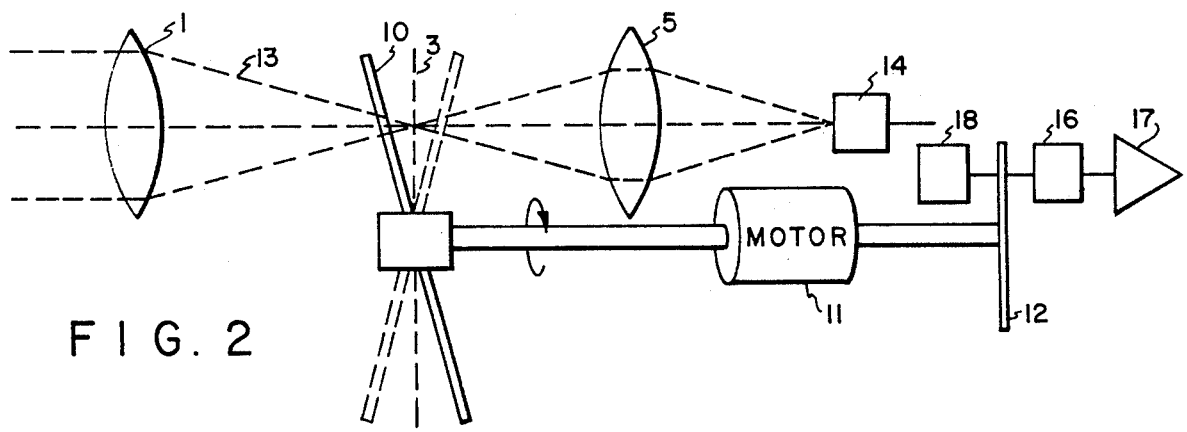
FIG. 2 is a diagrammatical representation of the optical focus detector shown in FIG. 1, utilizing a rotatable spatial filter disc inclined from a perpendicular with respect to an axis orthogonal to a predetermined image plane coinciding with the emulsion plane of the film within the camera.
Figure 6:
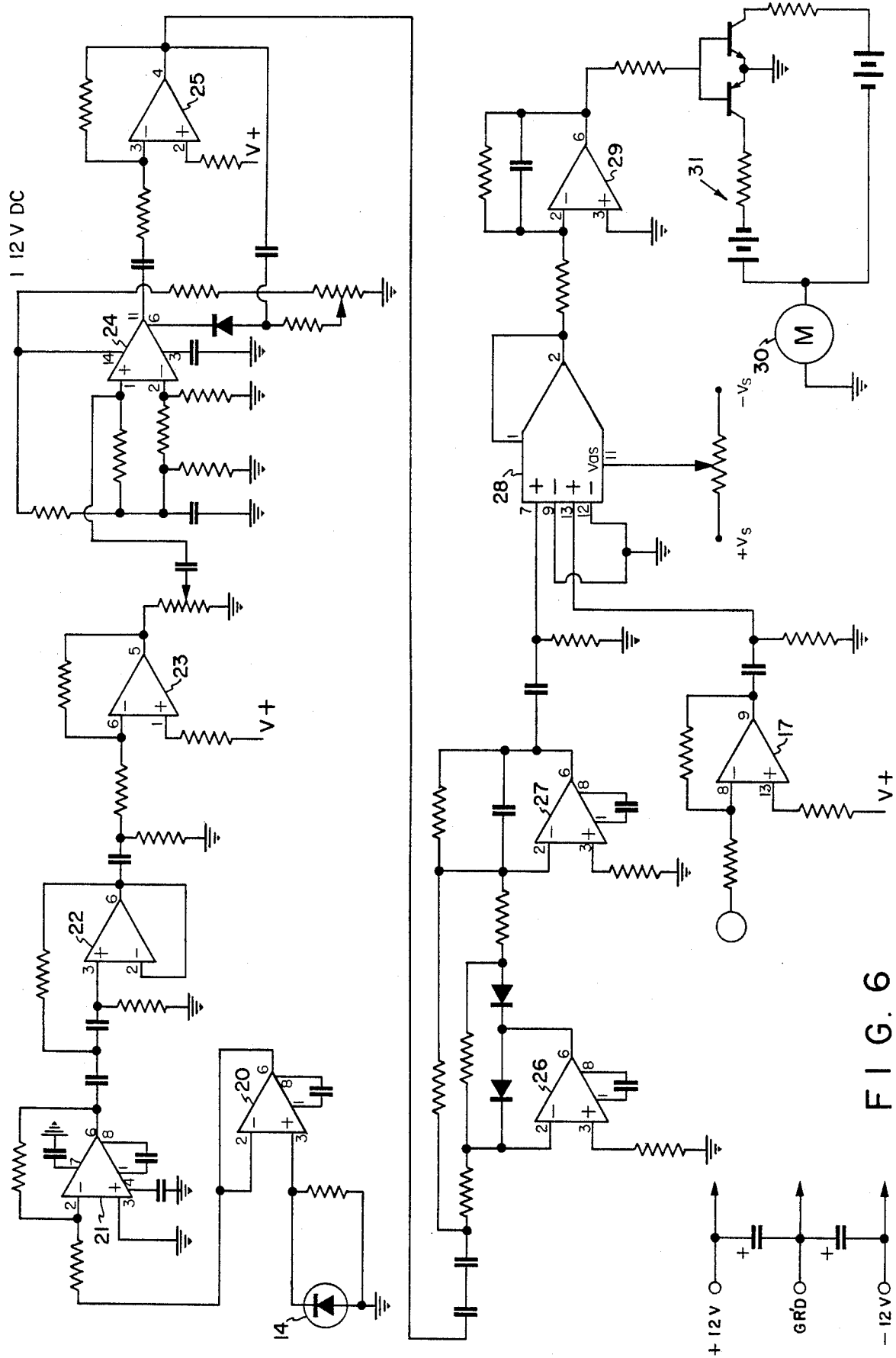
FIG. 6 is a schematic diagram of a preferred embodiment of the electrical signal responsive means illustrated in block diagram form in FIG. 1.

The spectrum of the image in the vicinity of the plane 3 is scanned and modulated by an optical focus detector indicated at 4 to provide a fluctuating light flux pattern. This light flux pattern contains information concerning the position of the image 2 relative to the plane 3. Focus detector 4 includes photo electric means, as illustrated in FIGS. 2 and 6, for deriving an electrical signal from said fluctuating light flux pattern. The fluctuating light flux pattern produced and sensed in detector 4 shifts in phase and changes in waveshape dependent upon the position of image 2 with respect to plane 3. Such changes in phase and waveshape produce corresponding changes in the electrical signal produced at the output of detector 4.

The electrical signal produced at the output of detector 4 is processed by suitable signal amplification and conditioning means illustrated by the numeral 5. The output signal from the means 5 is compared to a reference signal that is derived from the detector 4 and suitably multiplied and filtered by means illustrated at 6 to provide a direct current signal which is representative of the deviation in the position of the image 2 from its optimal focus position coincident with the plane 3.

The output signal from means 6 may be applied to an indicating meter illustrated at 7 to indicate the direction of corrective adjustment of the position of the lens 1 required for optimal focus of the image 2 in the plane 3. Additionally, and as illustrated in FIG. 1, the output signal from means 6 may be applied to a servo-control illustrated by the numeral 8. The servo control 8 is suitably connected by mechanical linkage indicated by numeral 9 to the lens 1 whereby the lens 1 can automatically be repositioned upon shift in the position of image 2 from the plane 3 to effect the restoration of the image to the plane 3.

FIG. 2 is a diagrammatic illustration of a preferred embodiment of the optical focus detector 4 illustrated in FIG. 1. In FIG. 2, plane 3 is shown as the plane of optimal or proper focus of the image, and as in FIG. 1, coincides with the proper placement of the emulsion plane of a photographic film in a camera.

Figure 3:
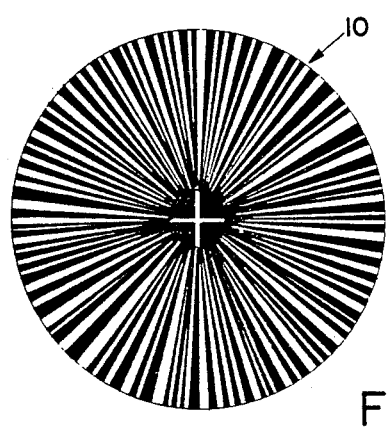
FIG. 3 is a plan view of the chopper disc employed in the optical apparatus portion illustrated in FIG. 2.
Figure 4:
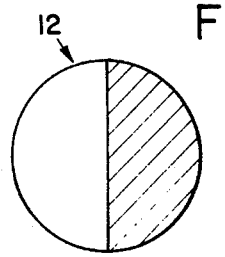
FIG. 4 is a plan view of a reference chopper disc of the optical apparatus portion illustrated in FIG. 2.

In FIG. 2, a rotatable spatial filter disc 10, somewhat inclined from the perpendicular with respect to an axis orthogonal to the image plane, is positioned in the vicinity of the plane 3. Disc 10, a plan view of which is illustrated in FIG. 3, is arranged to be rotated by a unidirectional electrical motor indicated by numeral 11. As shown in FIG. 2, the motor 11 also is arranged to rotate a disc shown at 12 to provide a synchronous reference signal, as further explained hereinafter. A plan view of the disc 12 is illustrated in FIG. 4.

The optical paths associated with the image position near the plane 3 are indicated by the broken line 13. This optical path is determined by the characteristics of the lens 1 and its position with respect to the plane 3 and the subject or object it is desired to image at the plane 3. The light ray components contained within the optical path are directed through the spatial filter comprising the rotating disc 10, and impinge upon a photo electrical sensor or cell shown at 14 after passing through a transfer lens 15. As the disc 10 rotates, the opaque radial sectors successively interrupt the light beam and simultaneously the edge of the disc oscillates through the plane 3 from one side to the other thereof. As described further hereinafter, rotation and oscillation of the disc produce fluctuating light flux patterns containing high frequency components. These patterns correspond to the said interruption modulated in accordance with the variation of the angular position of the disc 10 with respect to the focus of the image.

As illustrated in FIG. 3, the radial transparent and opaque sectors of disc 10 are arranged in pairs of equal width. On the semi-circle on either side of any diameter of the disc, the widths of adjacent sector pairs differ in a randomly selected manner. The arrangement is such, however, that diametrically opposite sector pairs have the same widths. As a result, upon rotation of the disc, the average transmission of light through the disc remains at 50 percent. Additionally, with the image in the plane 3, the light flux pattern produced by any sector pair is repeated by the sector pair at the diametrically opposite position on the disc. Thus, at focus, light flux patterns or wave forms are produced by the diametrically opposite sector pairs and after detection similar waveshape patterns or wave forms are produced. Due to the random nature of the chopper, errors that have otherwise tended to occur with prior art spatial filters are cancelled out.

Figure 5:
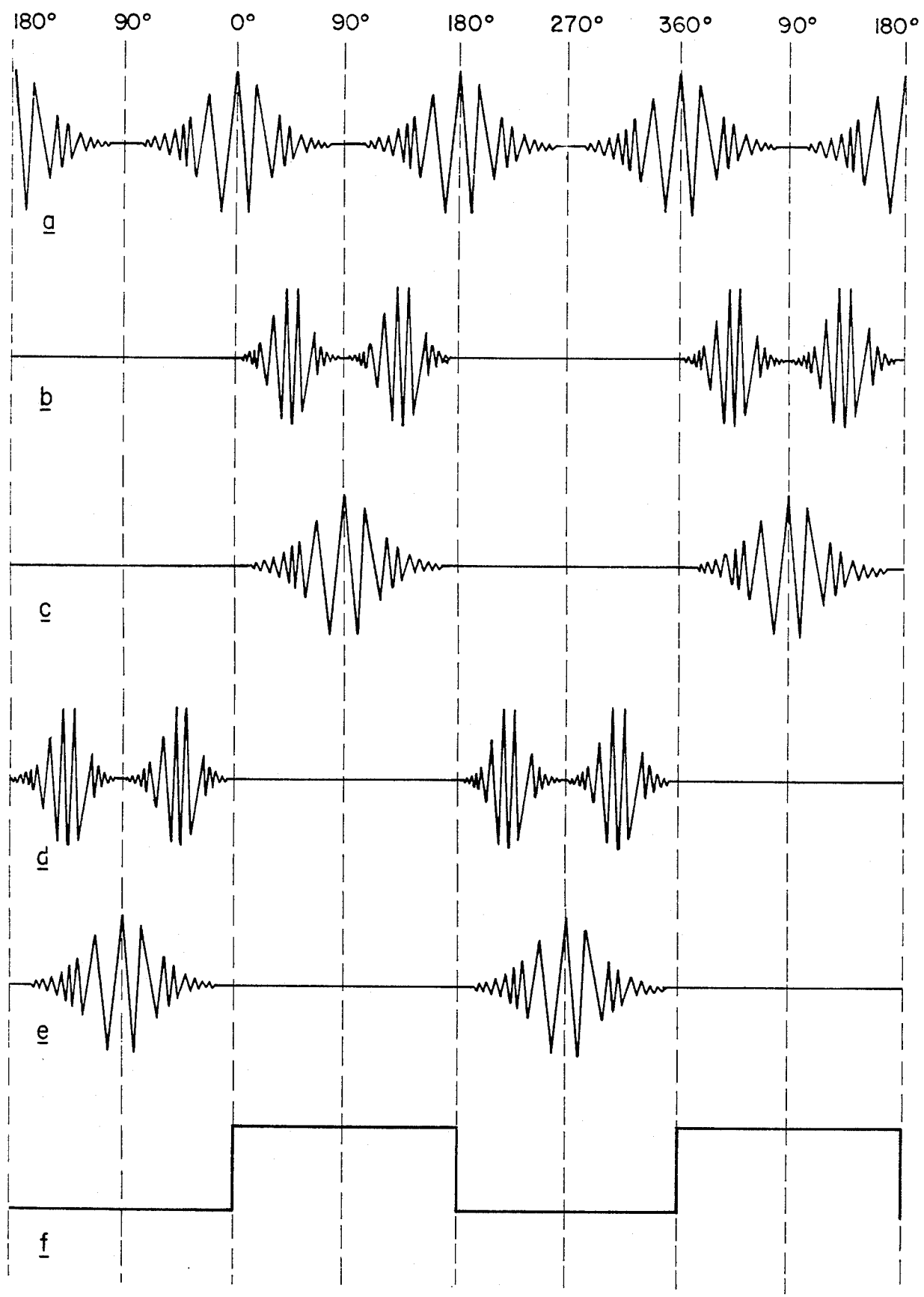
FIG. 5 is a series of wave diagrams illustrating the electrical signals produced by the recurring fluctuating light flux patterns, for various focus conditions of the optical apparatus portion illustrated in FIG. 2.

In FIG. 5, there is shown the general form of the light flux patterns that are produced by the illustrated preferred embodiment of the invention. As the rotating disc 10 oscillates, the plane examined is advanced from an extreme position at one side of the plane 3, for example, until in the middle of the focus scanning operation, the plane examined coincides with the plane 3. The focus scanning operation continues in its cycle until a position equidistant on the other side of the plane 3 is reached whereupon the direction of scanning is reversed. With the image at an optimal position, that is, in the plane 3, a light flux pattern such as that illustrated at FIG. 5a is produced as the cycles of operation are repeated. It will be seen that two similar waveshape patterns are produced in each cycle of rotation of the disc 10.

Typical forms of the light flux pattern that are produced upon shifting of the image to one side of the plane 3 are illustrated by FIGS. 5b and 5c. FIG. 5b shows the waveform produced upon a shift of the image half way, for example, from the plane 3 to the extreme position within the range of angular deflection of the disc 10. FIG. 5c shows the wave form produced at an extreme deflected position of the image. Similarly, FIGS. 5d and 5e show the wave forms produced for corresponding shifts of the image to the other side of the plane 3.

It will be noted by reference to FIG. 5 that upon shift in the position of the image to one side or the other, there will be a corresponding shift in phase of the light flux wave form or pattern that is produced. Additionally, in intermediate positions of shift of the image, the wave form obtained comprises closely spaced twin peaks, one such wave form being obtained once in each revolution of the disc 3. At extreme positions of shift of the image, the wave form produced has but a single peak. Again, one such wave form is produced once only in each revolution of the disc 10.

The reference frequency signal derived from the rotating disc 12, as seen in FIG. 2, is a square wave pulse, as illustrated in FIG. 5f. The time coincidence of the square wave pulse of FIG. 5f with the peaks of the wave pattern illustrated in FIG. 5a indicates that optimum image focus has been achieved. That is to say, the rotating disc 12 is so arranged as to provide a square wave in synchronism with the peaks of the wave forms illustrated in FIG. 5a which occur when the image is at the position of optimum focus. To this end the disc 12 is provided with transparent and opaque portions, and is arranged, in its rotation by motor 11, to interrupt light from a source 18 to a photoelectric sensor or cell 16. The output from sensor 16 is amplified by an amplifier 17. The position of disc 12 on the shaft of motor 11 is that required for the reference signal to be synchronized with the peaks of the wave forms illustrated in FIG. 5a, that is, the characteristic wave form that is obtained at the optimal condition of focus of the image. It will be noted that with the optimal focus condition of the image the fluctuating wave form pattern includes only second harmonic and higher frequency signals with respect to the square wave signal 5f.

Various known techniques may be employed for extracting from the fluctuating light patterns illustrated in FIG. 5 the specific information concerning the condition of focus. A preferred arrangement for extracting this focus information is illustrated in FIG. 6. As seen in FIG. 6, the photoelectric sensor 14 is connected to the input circuit of a voltage follower pre-amplifier illustrated at 20, to provide high input impedance. This allows the focus detector to operate in a region where logarithmic response is exhibited. This makes the output signal from pre-amplifier 20 less sensitive to brightness level.

The signal output from pre-amplifier 20 is amplified by an amplifier 21 and then is filtered by a high pass filter 22. The high pass filter removes alternating current components which may be caused by motion, alternating current lighting, or by low frequency components from the chopper 10. Typically, the filter 22 is arranged to pass from 3 Kilo Hertz (KH) up.

The signal output of the high pass filter is then amplified by an amplifier/buffer illustrated at 23. The output of the latter is applied to an automatic gain control unit comprised of devices indicated by reference numerals 24 and 25. The automatic gain control unit provides a standard peak to peak level regardless of subject contrast.

The output signal of device 25 is then detected and filtered by a detector-filter comprised of devices indicated at 26 and 27. This removes high frequency ripple.

The detected and filtered signal is then applied to a first pair of input terminals of a phase detector indicated at 28. The phase detector includes a second pair of input terminals to which a signal from the reference amplifier 17 is applied. The phase detector 28 reacts to any signal at the chopper frequency to provide a direct current output that depends upon the phase of such signal. An amplifier/filter 29 is provided to filter the output of detector 28. With the desired optimal or infocus condition of the image with the predetermined plane 3, only second harmonic and higher components are present. For this condition the filtered output of the phase detector 28 is a zero direct current. When the image is out of focus in one direction with respect to the plane 3, a direct current output of one polarity is provided by the phase detector 28. A direct current of the opposite polarity is provided by the filtered output of phase detector 28 when the image is out of focus in the other direction with respect to the plane 3.

The filtered direct current output from the phase detector 28 may be applied to the direct current meter 7 illustrated in FIG. 1 to provide a direct indication of the focus condition of the image with respect to the plane 3. Alternatively, or in addition, the output of phase detector 28 may be used to control the operation of a direct current focus motor illustrated at 30. To that end, the filtered output of the phase detector is applied to the input of an amplifier and motor control circuit shown at 31. The motor 30 is connected in the output of circuit 31, and is energized for rotation in one direction or the other depending upon the polarity of the direct current signal that is applied to the input of the circuit by the phase detector 28 and filter 29. The shaft of the motor 30 is connected by mechanical linkage 9 to the lens 1 and to an objective lens, not shown, of a camera for adjusting the positions of the lenses as required to establish an optimal focus relationship.

By way of illustration and example, and not by way of limitation, it is noted that the several elements or devices shown in symbolic form in FIG. 6 may, if desired, be of the commercially available types listed below:

| DEVICE | TYPE |
| --- | --- |
| Photo cell 14 | PIN 10D |
| Photo cell 16 | TIL 77 |
| Amplifiers 20, 21, 26 and 27 | LM 308N |
| Filter 22 | uA 741 C |
| Amplifiers 17, 23 and 25 | LM 3900 |
| Automatic gain control 24 | LM 370 |
| Phase detector 28 | AD 532 JD |
| Amplifier/Filter 29 | 741 |

Values for the several resistors, capacitors and diodes, illustrated and shown in FIG. 6 as interconnecting the enumerated devices but which have not been designated by reference numerals, may be selected, as appropriate, in a manner well known to those skilled in the art.

Thus, there has been provided in accordance with the present invention an improved optical means for detecting the focus of an image and for providing an output signal indicative of the condition of focus, said signal comprising fluctuating light flux patterns of phase and wave shape corresponding to the difference between the existing condition of focus and a desired focus condition, in which light flux pattern undesired errors tending to be obtained with prior art types of apparatus are cancelled out due to the random nature of the spatial filter used in deriving the light flux patterns.

The embodiments of the invention in which an exclusive property or privilege is claimed are defined as follows:

1. A combination comprising optical means for focusing an image and further means for providing an output signal representative of the direction said optical means is displaced from a predetermined position of optimum focus, said further means comprising spatial filtering means arranged to transmit spatial frequency components of said image to provide recurring fluctuating light flux patterns that are characteristic of the displacement of said optical means from said predetermined position of focus, said spatial filtering means including an interposed rotatable disc and means for rotating the latter, said disc having alternate relatively transparent and opaque radial sectors, the widths of said relatively transparent sectors being randomly different to keep said patterns characteristic of said displacement in the presence of images which tend to produce misleading out of phase effects in said patterns, said randomly different widths lying in a range which permits adequate transmission of said spatial frequency components for the spatial frequencies present in the images typically encountered in general photography, and means responsive to said patterns for producing said signal.

2. A combination as specified in claim 1, wherein said sectors are arranged in pairs, each of which consists of one of said relatively transparent sectors and one of the contiguous ones of said relatively opaque sectors, and wherein the two sectors of each of said pairs have equal width, whereby said disc has an average light transmission of 50 percent.

3. A combination as specified in claim 2, wherein each of said sectors has diametrically opposite to it another of said sectors, and wherein diametrically opposite sectors are of equal width.

* * * * *